(12) United States Patent
Nago

(10) Patent No.: US 9,365,260 B2
(45) Date of Patent: Jun. 14, 2016

(54) BICYCLE HYDRAULIC OPERATING DEVICE

(75) Inventor: Daisuke Nago, Osaka (JP)

(73) Assignee: Shimano Inc., Osaka (JP)

( * ) Notice: Subject to any disclaimer, the term of this patent is extended or adjusted under 35 U.S.C. 154(b) by 275 days.

(21) Appl. No.: 13/449,726

(22) Filed: Apr. 18, 2012

(65) Prior Publication Data

US 2013/0277162 A1    Oct. 24, 2013

(51) Int. Cl.
| | |
|---|---|
| *B60T 11/00* | (2006.01) |
| *B62L 3/02* | (2006.01) |
| *B62K 23/06* | (2006.01) |
| *B60T 7/10* | (2006.01) |
| *B62M 25/08* | (2006.01) |

(52) U.S. Cl.
CPC ............. *B62L 3/023* (2013.01); *B62K 23/06* (2013.01); *B60T 7/102* (2013.01); *B62M 25/08* (2013.01)

(58) Field of Classification Search
CPC ............ B62L 3/023; B62L 3/02; B60T 7/08; B60T 7/10; B60T 7/102; B60T 11/22; B62K 23/06; F16D 2121/02; F16D 2121/04
USPC ........... 188/344, 24.15, 24.22, 2 D; 74/502.2; 60/533, 594
See application file for complete search history.

(56) References Cited

U.S. PATENT DOCUMENTS

| | | | |
|---|---|---|---|
| 3,993,174 A | 11/1976 | Williams et al. | |
| 4,175,648 A | 11/1979 | Sule | |
| 4,391,353 A | 7/1983 | Mathauser | |
| 4,615,415 A | 10/1986 | Mathauser | |
| 4,921,081 A | 5/1990 | Chilcote | |
| 6,883,647 B1* | 4/2005 | Wen | 188/24.22 |
| 7,578,375 B2* | 8/2009 | Lin et al. | 188/344 |
| 2007/0131495 A1 | 6/2007 | Matsushita et al. | |
| 2007/0131503 A1 | 6/2007 | Matsushita et al. | |
| 2009/0031841 A1 | 2/2009 | Tetsuka | |
| 2010/0064838 A1 | 3/2010 | Siew et al. | |
| 2010/0083786 A1* | 4/2010 | Miki et al. | 74/489 |
| 2010/0166538 A1 | 7/2010 | Ning et al. | |
| 2010/0199798 A1* | 8/2010 | Uno | 74/491 |
| 2010/0218636 A1* | 9/2010 | Wen | 74/491 |
| 2011/0147149 A1* | 6/2011 | Tetsuka et al. | 188/344 |
| 2011/0185836 A1* | 8/2011 | Kawakami | 74/473.13 |
| 2012/0160625 A1* | 6/2012 | Jordan | 188/344 |
| 2012/0240715 A1* | 9/2012 | Tsai | 74/504 |
| 2013/0031998 A1* | 2/2013 | Miki et al. | 74/473.12 |
| 2013/0180815 A1* | 7/2013 | Dunlap | B62L 3/023 188/344 |

FOREIGN PATENT DOCUMENTS

| | | |
|---|---|---|
| TW | I24231261 B | 10/2005 |
| TW | M359489 U | 6/2009 |
| TW | M390914 U | 10/2010 |
| TW | 201118004 A | 6/2011 |
| TW | M412125 U | 9/2011 |

* cited by examiner

*Primary Examiner* — Nicholas J Lane
(74) *Attorney, Agent, or Firm* — Global IP Counselors

(57) ABSTRACT

A bicycle hydraulic operating device is basically provided with a main body, a hydraulic unit, a handlebar mounting structure and a lever. The main body includes a gripping portion. The hydraulic unit is mounted to the main body. The handlebar mounting structure is disposed on one of the main body and the hydraulic unit. The lever is pivotally mounted to one of the main body and the hydraulic unit.

27 Claims, 14 Drawing Sheets

BICYCLE HYDRAULIC OPERATING DEVICE

FIELD OF THE INVENTION

This invention generally relates to a bicycle operating device for operating a component. More specifically, the present invention relates to a bicycle hydraulic operating device for operating a hydraulically actuated component of a bicycle.

BACKGROUND INFORMATION

In recent years, some high performance bicycles have been provided with hydraulic disc brake systems or other brake types of hydraulic brake system such as hydraulic shoe brakes. In the case of bicycles, the hydraulic brake systems are typically actuated by a brake lever that is attached to a bicycle handlebar. The brake lever is typically part of a brake operating device that attaches the brake lever to the bicycle handlebar. The brake operating device typically includes a master piston that is slidably disposed in a cylinder bore of a master cylinder, and which is actuated by the brake lever. The master cylinder contains a hydraulic fluid. The cylinder bore of the master cylinder is in fluid communication with a disc brake caliper housing in the case of a hydraulic disc brake via a fluid conduit. Brake pads of the disc brake caliper housing are typically spaced apart from a rotor by a predetermined gap. As the brake lever is operated (i.e., contracted towards the handlebar), the master piston moves in the cylinder bore of the master cylinder to force liquid out of the master cylinder and into the fluid conduit connected to the caliper housing. The movement of fluid into the caliper housing causes the pistons in the caliper housing to move, and eventually brings the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

SUMMARY

Generally, the present disclosure is directed to various features of the bicycle hydraulic operating device. In one feature, a bicycle hydraulic operating device is provided that basically comprises a main body, a hydraulic unit, a handlebar mounting structure and a lever. The main body includes a gripping portion. The hydraulic unit is mounted to the main body. The handlebar mounting structure is mounted to one of the main body and the hydraulic unit. The lever is pivotally mounted to a lever attachment portion of the hydraulic unit.

In another feature, a bicycle hydraulic operating device is provided that basically comprises a main body, a hydraulic unit, a handlebar mounting structure and a lever. The main body includes a gripping portion. The hydraulic unit is mounted to the main body. The handlebar mounting structure is disposed on the hydraulic unit. The lever is pivotally mounted to one of the main body and the hydraulic unit.

These features and other features, objects, aspects and advantages of the disclosed bicycle hydraulic operating device will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
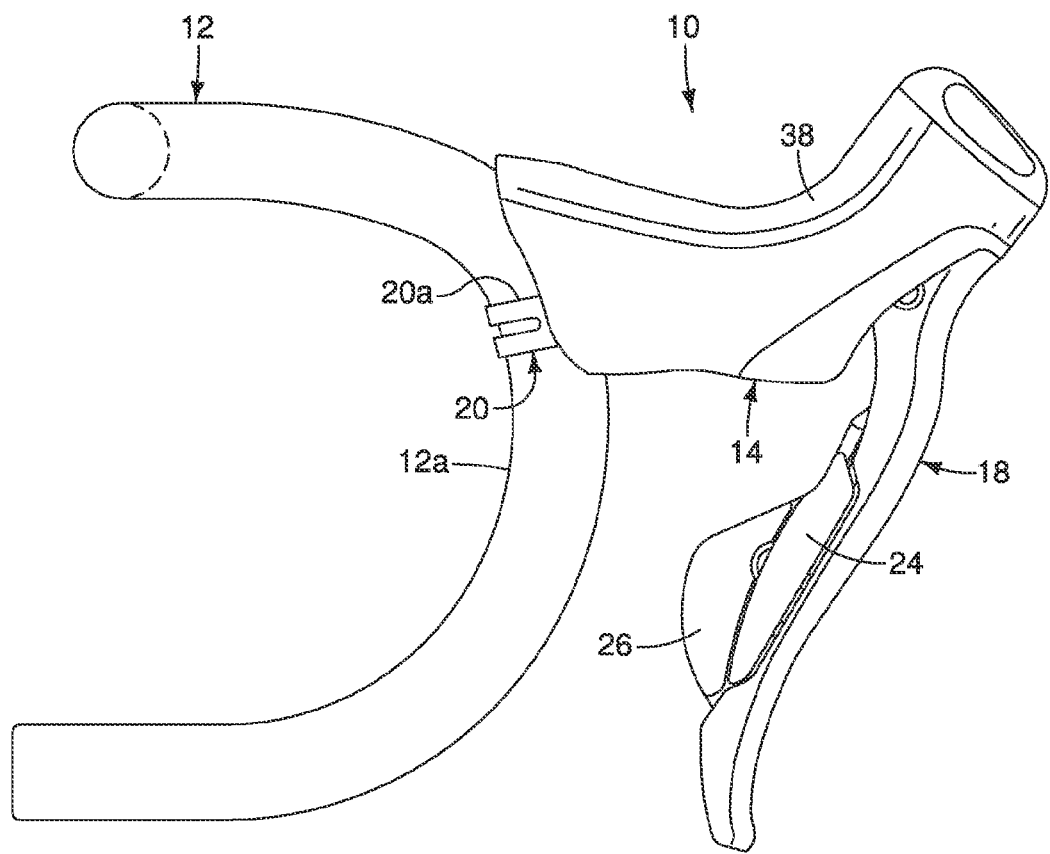
FIG. 1 is an outside elevational view of a dropdown bicycle handlebar that is equipped with a bicycle hydraulic brake operating device in accordance with a first embodiment.
Figure 2:
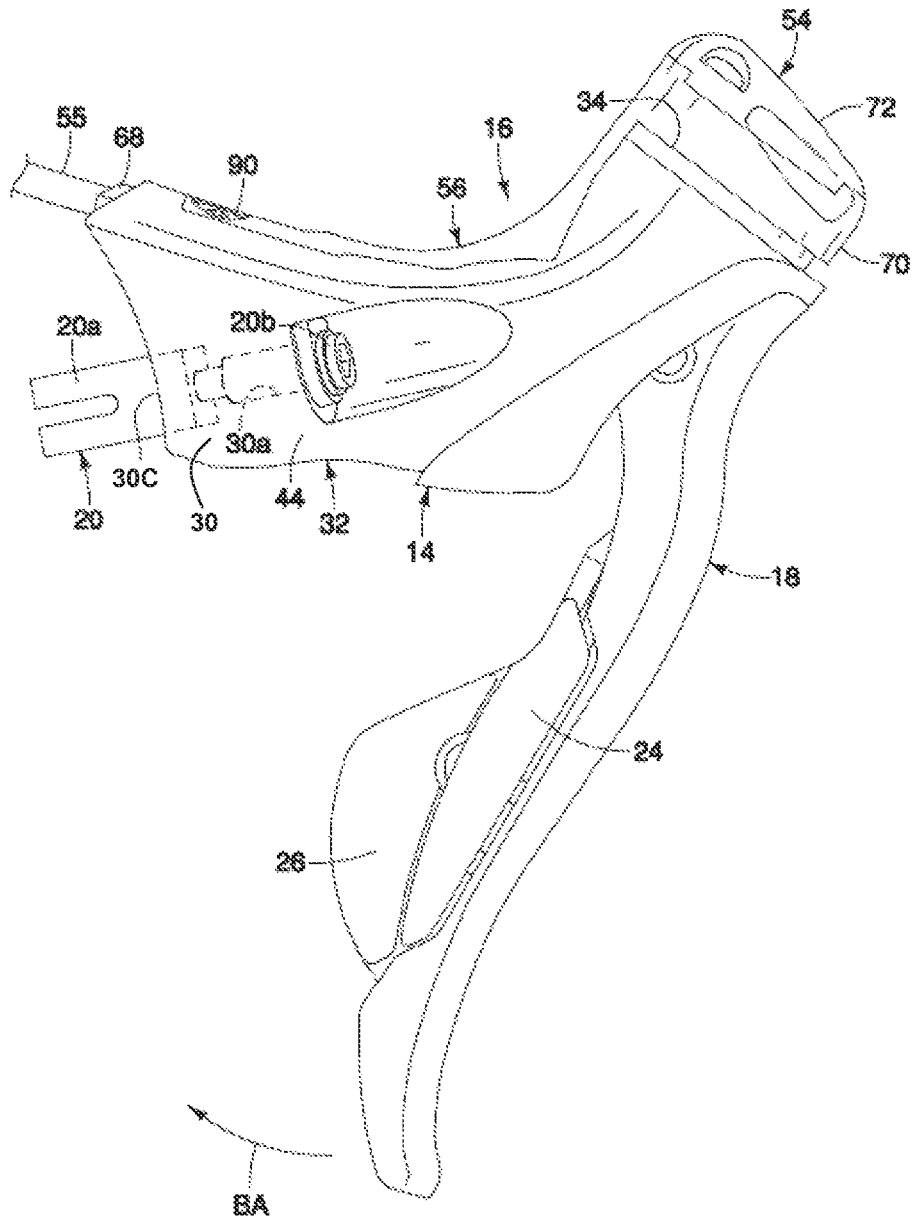
FIG. 2 is an outside elevational view of the bicycle hydraulic brake operating device illustrated in FIG. 1 with the grip cover removed.
Figure 3:
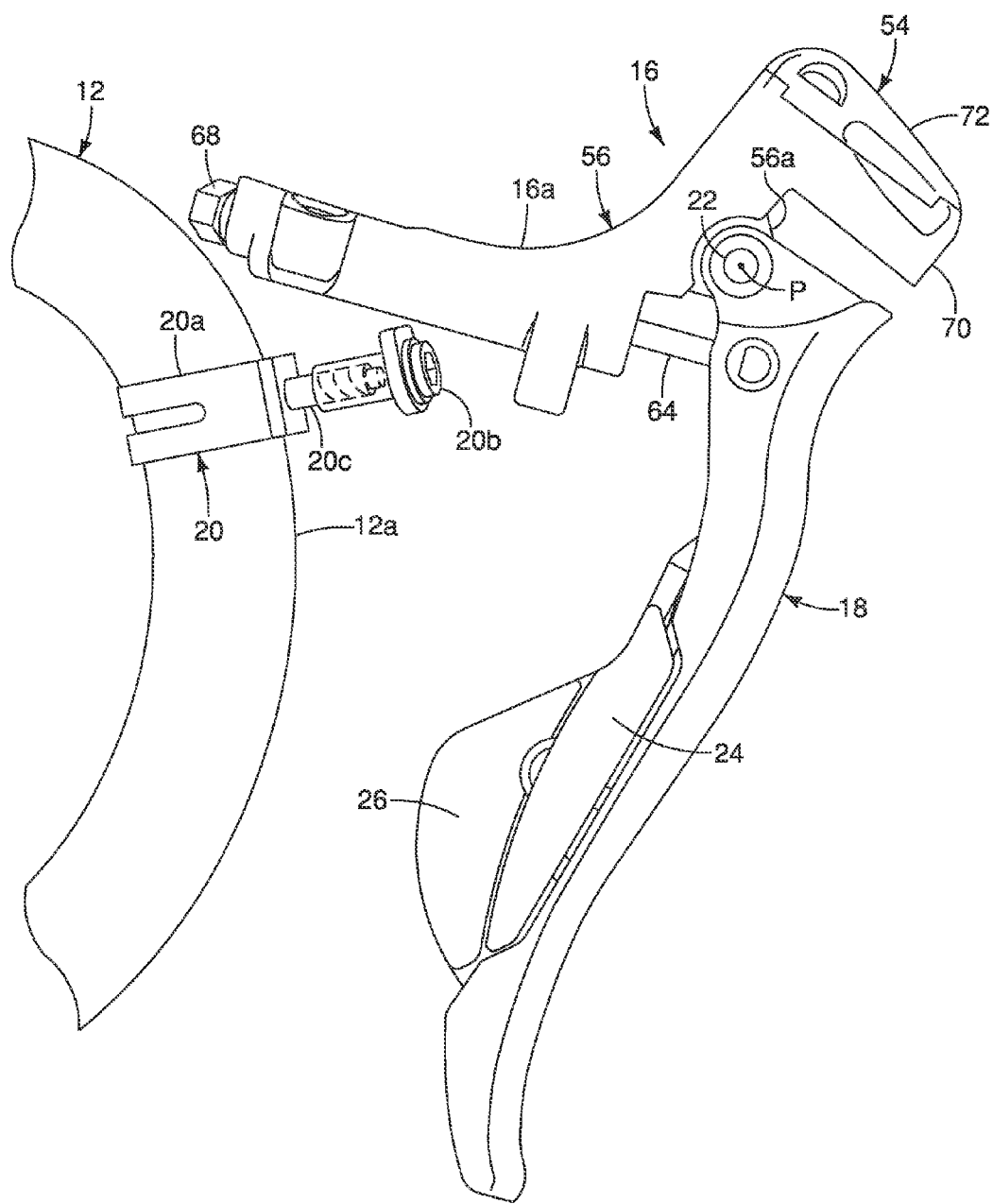
FIG. 3 is an outside elevational view of the hydraulic unit having the brake lever operatively attached to the master piston via the connecting rod with the main body removed.

Referring initially to FIGS. 1 to 8, a bicycle hydraulic brake operating device 10 is illustrated in accordance with a first embodiment. As illustrated in FIGS. 1 to 3, the bicycle hydraulic brake operating device 10 (hereinafter "bicycle hydraulic operating device 10") is a right hand side control device operated by the rider's right hand to operate a first brake device (not shown) and a first gear shifting device (not shown, e.g., an electric rear derailleur). It will be apparent to those skilled in the bicycle field that the configuration of the bicycle shift operating device 10 can be adapted to a left hand side control device that is operated by the rider's left hand.

As seen in FIGS. 1 and 3, the bicycle hydraulic operating device 10 is mounted a dropdown bicycle handlebar 12. In particular, the bicycle hydraulic operating device 10 is mounted to a curved section 12a of the dropdown bicycle handlebar 12. In other words, the bicycle hydraulic operating device 10 is particularly designed for a bicycle that is equipped with the dropdown bicycle handlebar 12. As explained below, the bicycle hydraulic operating device 10 includes both a braking function and a shifting function in a single unit. However, it will be apparent to those skilled in the bicycle field from this disclosure that the shifting function could be eliminated from the bicycle hydraulic operating device 10 if needed and/or desired. The bicycle hydraulic operating device 10 is a bicycle hydraulic brake operating device that is specifically designed to be mounted to the curved section 12a of the dropdown bicycle handlebar 12.

In the first embodiment, the bicycle hydraulic operating device 10 is a bicycle brake/shift device, which is also known as a bicycle brifter. A bicycle brifter is a device that includes both a braking function and a shifting function in a single unit that is mounted to the bicycle. A bicycle dropdown brifter is a device that is specifically configured to be mounted to the curved section 12a of the dropdown bicycle handlebar 12, as illustrated in FIG. 1, and that includes both braking and shifting functions in a single unit.

As illustrated in FIG. 2, the bicycle hydraulic operating device 10 basically includes a main body 14, a hydraulic unit 16, an operating lever 18 and a handlebar fastener 20. Since the bicycle hydraulic operating device 10 is configured to actuate a brake device (not shown), the hydraulic unit 16 will hereinafter be referred to as the "hydraulic brake unit 16" and the operating lever 18 will hereinafter be referred to as the "brake lever 18". Thus, the brake lever 18 actuates the hydraulic brake unit 16 upon movement of the brake lever 18 relative to the hydraulic brake unit 16 to perform a braking operation of a brake device (not shown).

As illustrated in FIG. 3, the brake lever 18 is directly pivotally mounted to the hydraulic brake unit 16 by a pivot pin 22 that defines a pivot axis P. As explained below, the brake lever 18 is biased to a rest position with respect to the main body 14 and the hydraulic brake unit 16. Thus, the brake lever 18 moves relative to the main body 14 and the hydraulic brake unit 16 from the rest position along a brake operating path BA (FIG. 2) to a braking position for performing a braking operation of a brake device (not shown).

In the first embodiment, the brake lever 18 is provided with a pair of gearshift operating parts 24 and 26 for performing gearshifting operations of a gear changing device (not shown). The gearshift operating parts 24 and 26 are electrically connected to a gearshift control unit 28 that is mounted within a recess in the main body 14. The gearshift operating parts 24 and 26 are constructed as shown in U.S. Patent Application Publication No. 2009/0031841 A1 (assigned to Shimano, Inc.). It will be apparent to those skilled in the bicycle field that the gearshift operating parts 24 and 26 that are not limited to the illustrated structure and arrangement, but rather other suitable structures and arrangements can be used as needed and/or desired. The gearshift control unit is a microcomputer that is located in the main body 14. However, the gearshift control unit 28 can be remotely located if needed and/or desired. Since various electrical shifting systems such as the one illustrated herein are known in the bicycle field, the gearshift operating parts 24 and 26 and the gearshift control unit 28 will not be discussed herein for the sake of brevity.

As illustrated in FIG. 2, the main body 14 has a handlebar attachment portion 30 that is integrally formed at one end for contacting the handlebar 12. The handlebar attachment portion 30 has the handlebar fastener 20 attached thereto. Thus, the handlebar fastener 20 and the handlebar attachment portion 30 constitute a handlebar mounting structure. In this way, in this first embodiment, the handlebar mounting structure (the handlebar fastener 20 and the handlebar attachment portion 30) is disposed on the main body 14. While the handlebar attachment portion 30 is an integral part of the main body 14 in this first embodiment, the handlebar attachment portion 30 can be a separate part that is fixed to the main body 14. The main body 14 is secured to the hydraulic cylinder housing 56 with a screw 92 (see FIG. 8).

The main body 14 includes a gripping portion 32 and a pommel portion 34. The handlebar attachment portion 30 is integrally formed with the gripping portion 32 of the main body 14 in this first embodiment. The main body 14 together with the handlebar attachment portion 30 defines a drop down handlebar bracket which is made of a rigid, hard material. The gripping portion 32 is located at a middle portion of the drop down handlebar bracket. The pommel portion 34 is located at a forward free end of the drop down handlebar bracket. In this first embodiment, basically, the handlebar attachment portion 30, the gripping portion 32 and the pommel portion 34 are primarily formed as a one-piece, unitary member. Of course, the handlebar attachment portion 30, the gripping portion 32 and the pommel portion 34 can have removable panels as needed and/or desired. For example, an outer panel of the gearshift control unit 28 defines a portion of the gripping portion 32 in this first embodiment.

In this first embodiment, the hydraulic unit 16 and the handlebar fastener 20 are both directly mounted to the main body 14, while the brake lever 18 is pivotally mounted to the hydraulic unit 16. Thus, the brake lever 18 is indirectly mounted to the main body 14 in the first embodiment.

As illustrated in FIG. 1, a grip cover 38 is stretched over at least the gripping portion 32 and a pommel portion 34 to provide a cushion to the gripping portion 32 of the main body 14 and to provide an attractive appearance. Typically, the grip cover 38 is made of elastic material such as rubber.

The handlebar fastener 20 is a conventional handlebar clamp that is attached to the main body 14 for releasably securing the main body 14 to the curved section 12a of the dropdown bicycle handlebar 12. The handlebar fastener 20 basically includes a clamping band 20a (i.e., a handlebar clamping member) and a first fastener part 20b (nut) that screws onto a second fastener part 20c (bolt) of the clamping band 20a. The first and second fastener parts 20b and 20c are located in a hole 30a of the handlebar attachment portion 30. In this way, a head of the first fastener part 20b applies a first force on the handlebar attachment portion 30 and a head of the second fastener part 20c applies a second force on the clamping band 20a when the handlebar fastener 20 is tightened to secure the main body 14 to the curved section 12a of the dropdown bicycle handlebar 12. By tightening the first fastener part 20b, the clamping band 20a is moved toward the handlebar attachment portion 30 such that the curved section 12a of the dropdown bicycle handlebar 12 is squeezed between the clamping band 20a and the handlebar attachment portion 30. It will be apparent to those skilled in the bicycle field that the handlebar fastener 20 that is not limited to the illustrated clamp, but rather other suitable attachment mechanisms can be used as needed and/or desired. In any case, the handlebar fastener 20 is mounted on the handlebar attachment portion 30 of the main body 14 in the first embodiment.

Figure 4:
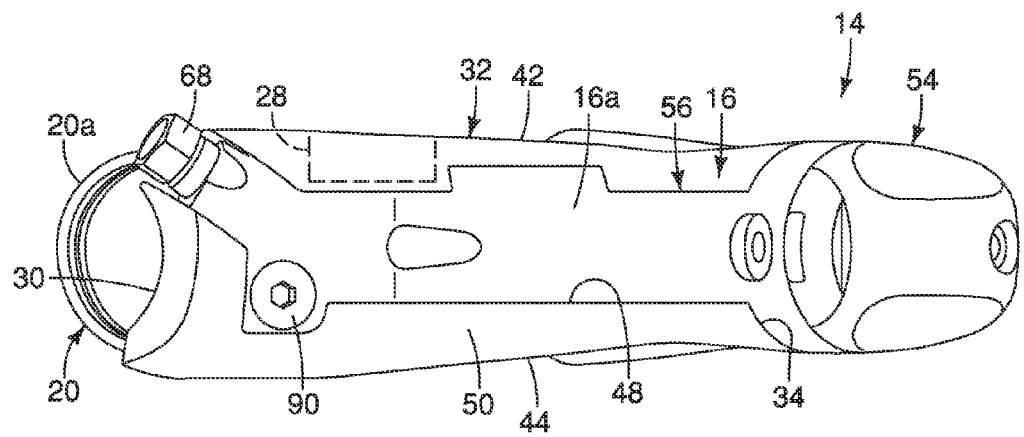
FIG. 4 is a top plan view of the bicycle hydraulic brake operating device illustrated in FIGS. 1 and 2 with the grip cover removed.
Figure 6:
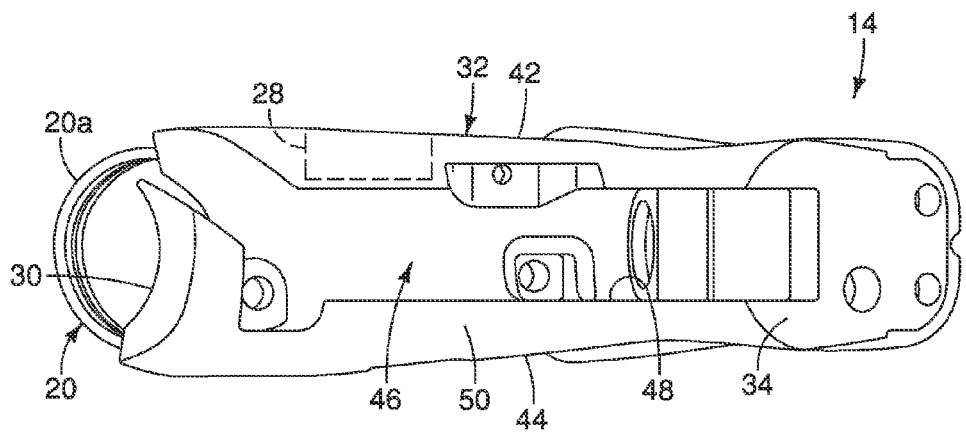
FIG. 6 is a top plan view of the main body (i.e., the drop down handlebar bracket) of the bicycle hydraulic brake operating device illustrated in FIG. 4 with the hydraulic unit removed.

A curved handlebar contact surface 30c of the handlebar attachment portion 30 contacts the curved section 12a of the dropdown bicycle handlebar 12 when the fastener part 20b is tightened to move the clamping band 20a towards the handlebar attachment portion 30. Referring to FIGS. 4 and 6, the main body 14 also has a pair of lateral sidewalls 42 and 44 with a receiving cavity 46 formed between the lateral sidewalls 42 and 44. The main body 14 also has an insertion opening 48 formed in a top surface 50 of the main body 14. Thus, the top surface 50 of the main body 14 defines the insertion opening 48 of the receiving cavity 46. In this way, the insertion opening 48 is located between the lateral sidewalls 42 and 44 as seen from the top plan view of FIG. 3.

Figure 7:
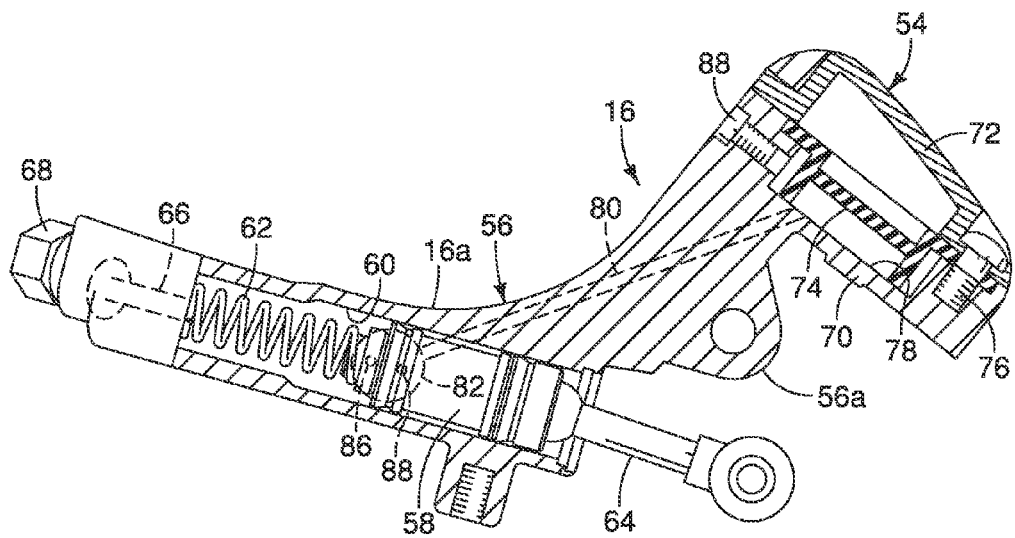
FIG. 7 is a center longitudinal cross sectional view of the hydraulic unit of the bicycle hydraulic brake operating device illustrated in FIGS. 1 to 3 as seen along section line 7-7 of FIG. 5.
Figure 8:
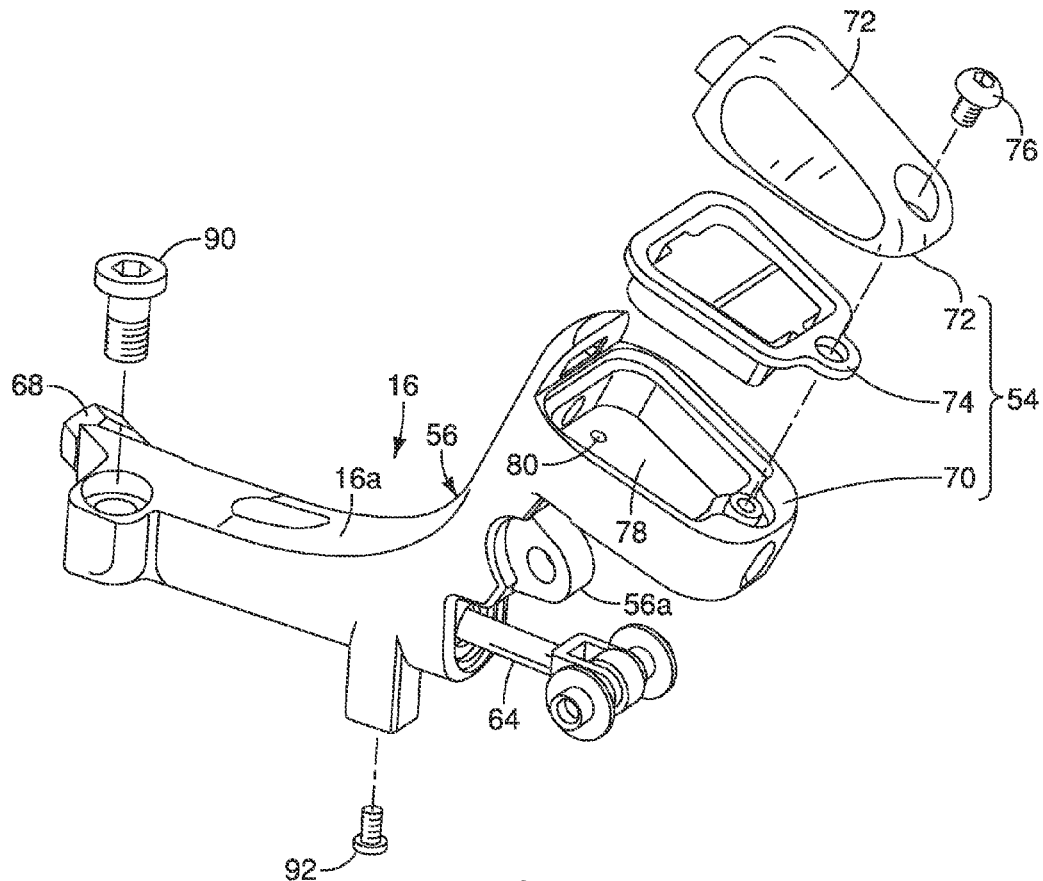
FIG. 8 is a partially exploded perspective view of the hydraulic unit of the bicycle hydraulic brake operating device illustrated in FIGS. 1 to 3.
Figure 9:
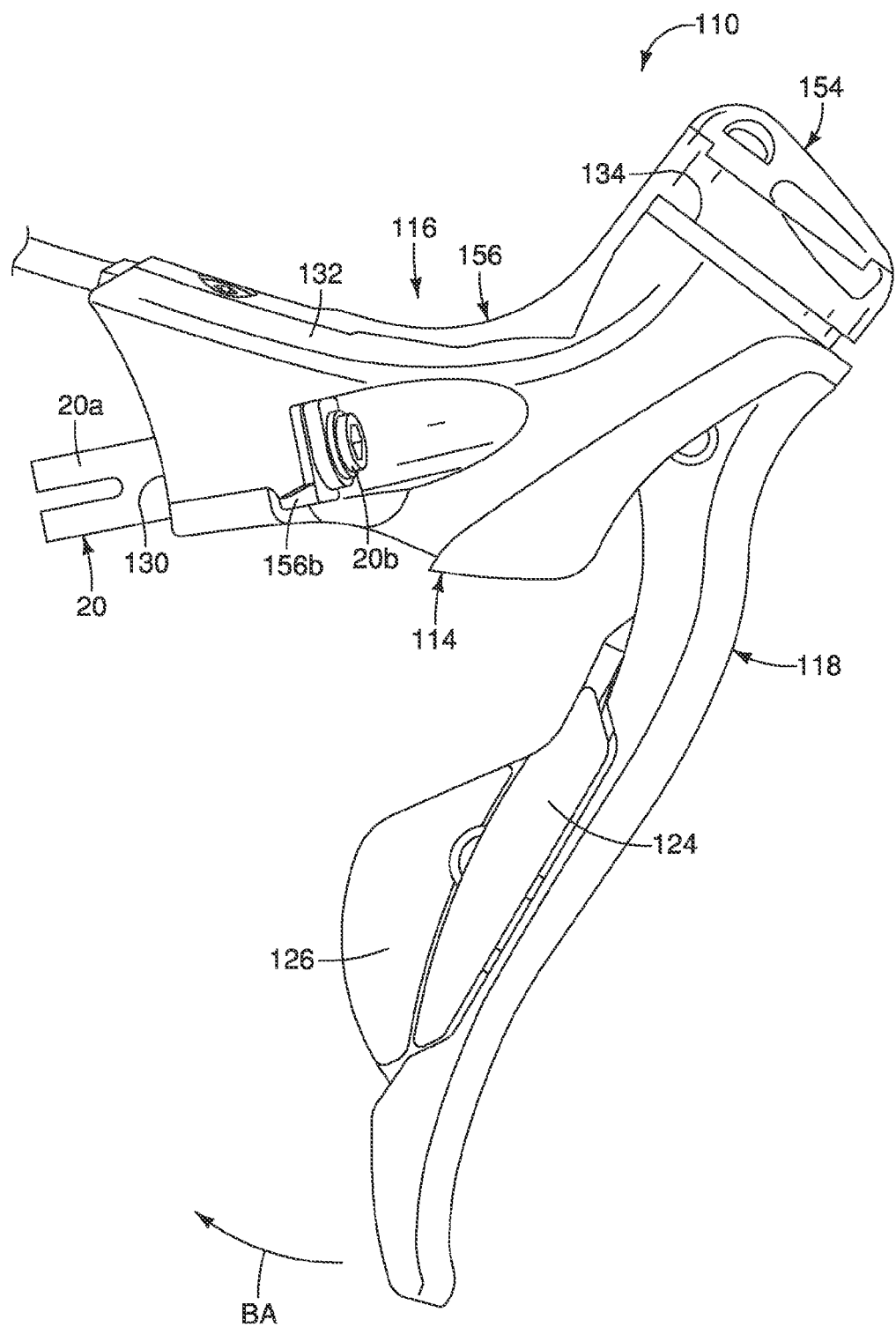
FIG. 9 is an outside elevational view of a bicycle hydraulic brake operating device in accordance with a second embodiment with the grip cover removed.

Referring mainly to FIGS. 7 and 8, the hydraulic brake unit 16 is provided with a fluid reservoir tank 54. The hydraulic brake unit 16 is in fluid communication with a hydraulic disc brake system (not shown) by a hydraulic hose or tube 55 (See FIG. 2). Basically, operation of the brake lever 18 causes hydraulic fluid to move from the hydraulic brake unit 16 to a slave piston or pistons in a hydraulic brake caliper such that brake pads come into contact with a rotor for applying frictional resistance and causing the bicycle to slow down or stop. Of course, the bicycle hydraulic brake operating device 10 is not limited to being used with a hydraulic disc brake system. Rather, the bicycle hydraulic brake operating device 10 can be used with other brake system such as hydraulic shoe brakes.

As illustrated in FIG. 7, the hydraulic brake unit 16 basically includes a hydraulic cylinder housing 56 and a piston 58. The hydraulic cylinder housing 56 is often called a master cylinder and the piston 58 is often called a master piston. The hydraulic cylinder housing 56 is supported by the main body 14. In particular, the hydraulic cylinder housing 56 is disposed within the gripping portion 32 of the main body 14. The hydraulic cylinder housing 56 has an integral lever attachment portion 56a. The brake lever 18 is pivotally mounted to the lever attachment portion 56a of the hydraulic cylinder housing 56 by the pivot pin 22.

The piston 58 is movably disposed within a cylinder bore 60 of the hydraulic cylinder housing 56 in a reciprocal manner in response to operation of the brake lever 18. The piston 58 and the internal surface of the cylinder bore 60 define a hydraulic chamber of the hydraulic brake unit 16. A biasing element 62 is disposed in the cylinder bore 60 for biasing the piston 58 to a rest position. In the first illustrated embodiment, the biasing element 62 is a coil compression spring (return spring) that also biases the brake lever 18 to its rest position as seen in FIG. 6. As illustrated in FIG. 3, the brake lever 18 is operatively connected to the piston 58 by a connecting rod 64.

In the first illustrated embodiment, the connecting rod 64 is connected to the brake lever 18 with a reach adjustment connection (not illustrated) that adjusts the reach of the brake lever 18. The illustrated reach adjustment connection between the connecting rod 64 and the brake lever 18 substantially similar in construction to the reach adjustment connection that is disclosed in U.S. Patent Application Publication No. 2011/0147149 A1 (assigned to Shimano, Inc.) Also as illustrated in FIG. 6, the main body 14 includes a piston end position adjustment connection that controls relative positions of the brake lever 18 and the piston 58 in their rest positions with respect to the hydraulic cylinder housing 56.

Figure 5:
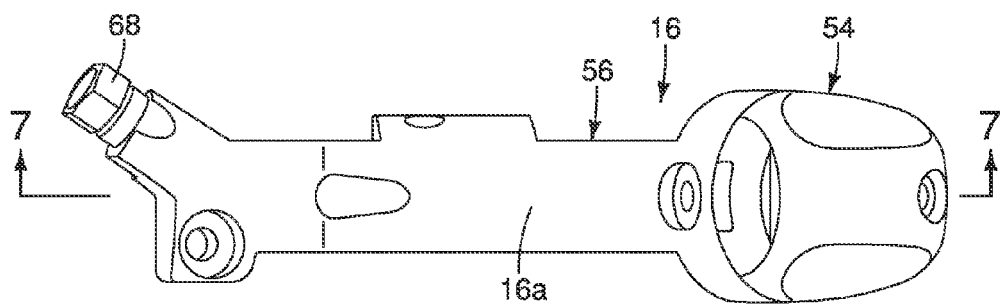
FIG. 5 is a top plan view of the hydraulic unit of the bicycle hydraulic brake operating device illustrated in FIG. 4 with the main body removed.

As illustrated in FIGS. 4, 5 and 6, the hydraulic brake unit 16 is disposed within the receiving cavity 46 of the main body 14. Thus, the hydraulic brake unit 16 is dimensioned relative to the insertion opening 48 to be inserted into the receiving cavity 46 via the insertion opening 48. In this way, a top surface 16a of the hydraulic cylinder housing 56 of the hydraulic brake unit 16 forms a seat of the gripping portion 32 for the rider's hand. In other words, the top surface 16a of the hydraulic cylinder housing 56 closes the insertion opening 48 and smoothly mates with the top surface 50 of the main body 14. As illustrated in FIG. 4, the insertion opening 48 is located between the lateral sidewalls 42 and 44 at the top surface 50 of the main body 14. Alternatively, the insertion opening 48 can be relocated between the lateral sidewalk 42 and 44 at a bottom surface of the main body 14 such that the hydraulic brake unit 16 is inserted into the main body 14 from below.

As seen in FIG. 5, a top plan view of the hydraulic brake unit 16 is illustrated after being removed from the main body 14. Since the handlebar fastener 20 is attached to the main body 14, the hydraulic brake unit 16 can be removed from the main body 14 while the hydraulic brake unit 16 remains attached to the main body 14. In particular, as seen in FIG. 6, a top plan view of the main body 14 (i.e., the drop down handlebar bracket) and the handlebar fastener 20 are illustrated after the hydraulic brake unit 16 has been removed from the main body 14. In this way, the hydraulic brake unit 16 can be removed from the main body 14 without detaching the main body 14 from the handlebar 12. In other words, as can be readily determined from the top views of the hydraulic brake unit 16 (FIG. 5) and the main body 14 (FIG. 6), the hydraulic brake unit 16 and the main body 14 are configured such that the hydraulic brake unit 16 can be easily removed in a vertical direction while the main body 14 is attached to the handlebar 12. As seen in FIG. 6, the insertion opening 48 is completely located between the lateral sidewalls 42 and 44. In this way, the hydraulic brake unit 16 of FIG. 5 is disposed completely located between the lateral sidewalls 42 and 44 of the main body 14 as seen in FIG. 4. With this configuration of the main body 14 and the hydraulic brake unit 16, the main body is reinforced by the hydraulic brake unit 16 to provide a strong gripping area for the rider to grip.

In this first embodiment, the fluid reservoir tank 54 is an integrated part of the hydraulic unit 16. The hydraulic unit 16 is directly mounted on the main body 14, and thus, the fluid reservoir tank 54 is supported by the main body 14 via the hydraulic unit 16. However, as in one of the latter embodiments, the fluid reservoir tank 54 can be separate from the hydraulic unit 16 and mounted directly to the main body 14, if needed and/or desired. In this first embodiment, the fluid reservoir tank 54 is disposed at an upper side of the main body 14 relative to the pivot axis P of the brake lever 18 while the bicycle hydraulic brake operating device 10 is in the installed position. Also in this first embodiment, the fluid reservoir tank 54 is at least partially disposed on the main body 14 at a location primarily forward of the pivot axis P of the brake lever 18 while the bicycle hydraulic brake operating device 10 is in the installed position. In particular, the fluid reservoir tank 54 is disposed above the hydraulic cylinder housing 56 at a location on the pommel portion 34 of the main body 14. Of course, it will be apparent to those skilled in the bicycle field from this disclosure that the fluid reservoir tank 54 is not limited to the illustrated location, but rather other suitable locations as disclosed in the later embodiments can also be used. In any case, the location of the fluid reservoir tank. 54 is preferably supported by one of the main body 14 and the brake lever 18 at a location spaced from an area directly above the hydraulic cylinder housing 56 while the bicycle hydraulic brake operating device 10 is in an installed position.

As illustrated in FIG. 7, the hydraulic cylinder housing 56 has an outlet port 66 that extends from the cylinder bore 60 to the outside of the hydraulic cylinder housing 56. The outlet port 66 is partially threaded to receive a hydraulic hose connector 68 for attaching the hydraulic hose 55. Thus, as the brake lever 18 is pivoted around the pivot axis P relative to the hydraulic unit 16, the piston 58 moves within the cylinder bore 60 of the hydraulic cylinder housing 56 against the force of the biasing element 62 to force hydraulic fluid out of the cylinder bore 60 through the outlet port 66.

As illustrated in FIGS. 7 and 8, the fluid reservoir tank 54 includes a reservoir 70, a cover 72 and a flexible diaphragm 74. The flexible diaphragm 74 is disposed between the reservoir 70 and the cover 72. The cover 72 and the flexible diaphragm 74 are attached to the reservoir 70 by a screw 76 such that the cover 72 covers a hydraulic fluid chamber 78 defined by the reservoir 70. The flexible diaphragm 74 includes a protruding part that is extends into the hydraulic fluid cavity 78. In the first illustrated embodiment, the hydraulic cylinder housing 56 and the reservoir 70, which defines the fluid chamber 78 of the fluid reservoir tank 54, are provided as a part of a unitary, one-piece member. The fluid reservoir tank 54 is in fluid communication with the hydraulic cylinder housing 56 by a passageway 80. More specifically, the remote end of the passageway 80 with respect to the reservoir 70 has an enlarged area 82 with a timing port 86 and a compensation port 88, both of which are in fluid communication with the cylinder bore 60. The functions of the timing port 86 and the compensation port 88 are well known and will not be described further.

Referring now to FIGS. 9 to 12, a bicycle hydraulic brake operating device 110 is illustrated in accordance with a second embodiment. The bicycle hydraulic operating device 110 basically includes a main body 114, a hydraulic unit 116, an operating lever 118 and the handlebar fastener 20 of the first embodiment. The main difference of the bicycle hydraulic brake operating device 110 from the bicycle hydraulic brake operating device 10 is that the handlebar fastener 20 mounted directly to the hydraulic unit 116 in this second embodiment and is not directly mounted the main body 114. In view of the similarity between the first and second embodiments, the bicycle hydraulic operating device 110 will not be discussed in detail for the sake of brevity. Thus, the descriptions of the parts of the second embodiment that are identical or nearly identical to the parts of the first embodiment may be omitted for the sake of brevity. Also in view of the similarity between the first and second embodiments, the parts of the second embodiment that are identical in function to the corresponding parts of the first embodiment will be given the same reference numerals as the parts of the first embodiment, but increased by one hundred.

In this second embodiment, the brake lever 118 is directly pivotally mounted to the hydraulic unit 116 by a pivot pin 122 that defines the pivot axis P. Thus, the brake lever 118 is coupled to the hydraulic unit 116 in the same manner as the first embodiment. Similar to the first embodiment, the brake lever 118 is provided with a pair of gearshift operating parts 124 and 126 connected to a gearshift control unit (not shown). The main body 114 is the same as the main body 14, except that the main body 114 has been modified to accommodate the modifications to the hydraulic unit 116 as discussed below. Thus, the main body 114 includes a handlebar contact portion 130, a gripping portion 132 and a pommel portion 134. Although not shown, the grip cover 38 of the first embodiment is stretched over at least the gripping portion 132 and a pommel portion 134 in the same manner as the first embodiment.

Figure 10:
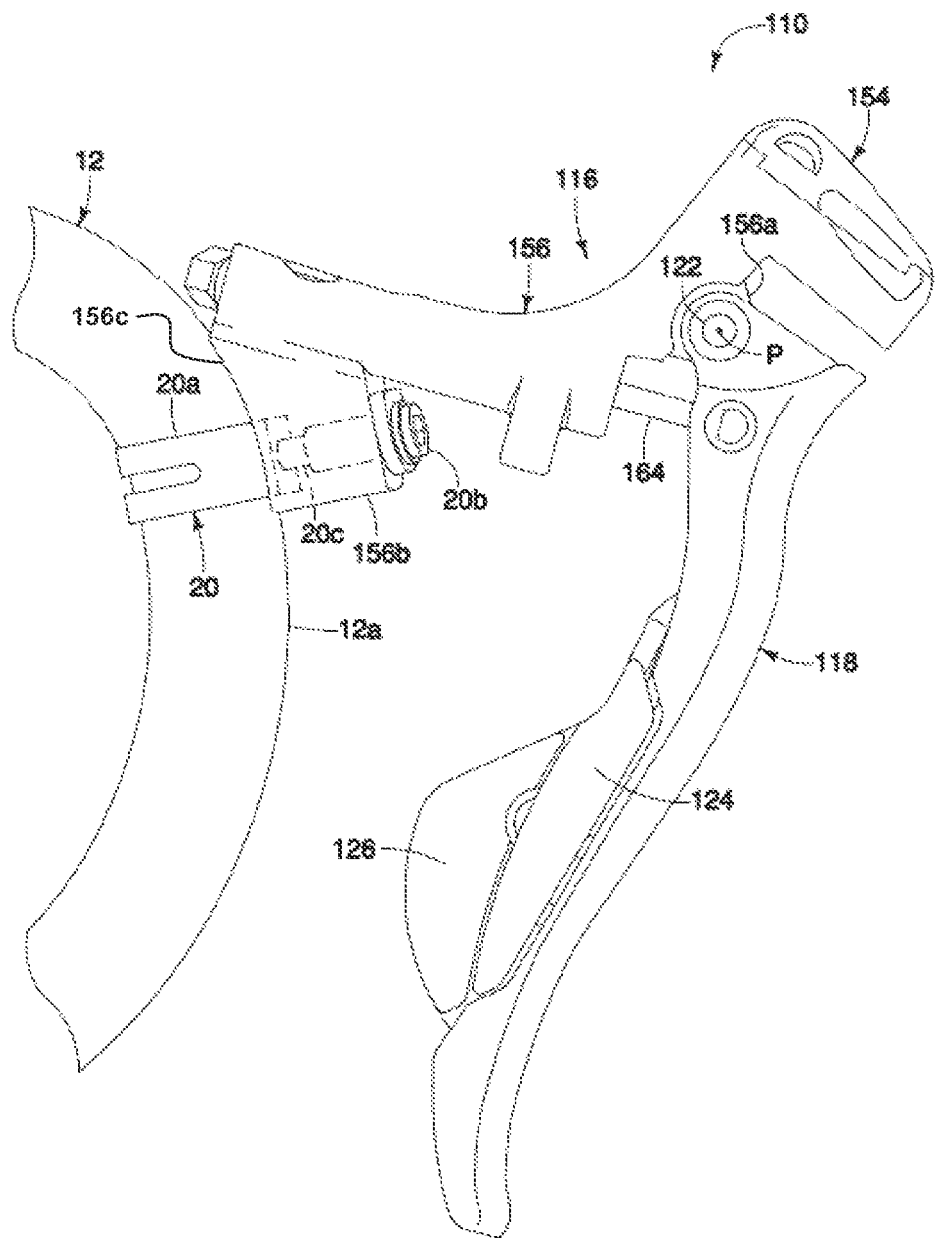
FIG. 10 is an outside elevational view of the hydraulic unit having the brake lever operatively attached to the master piston via the connecting rod with the main body removed.
Figure 11:
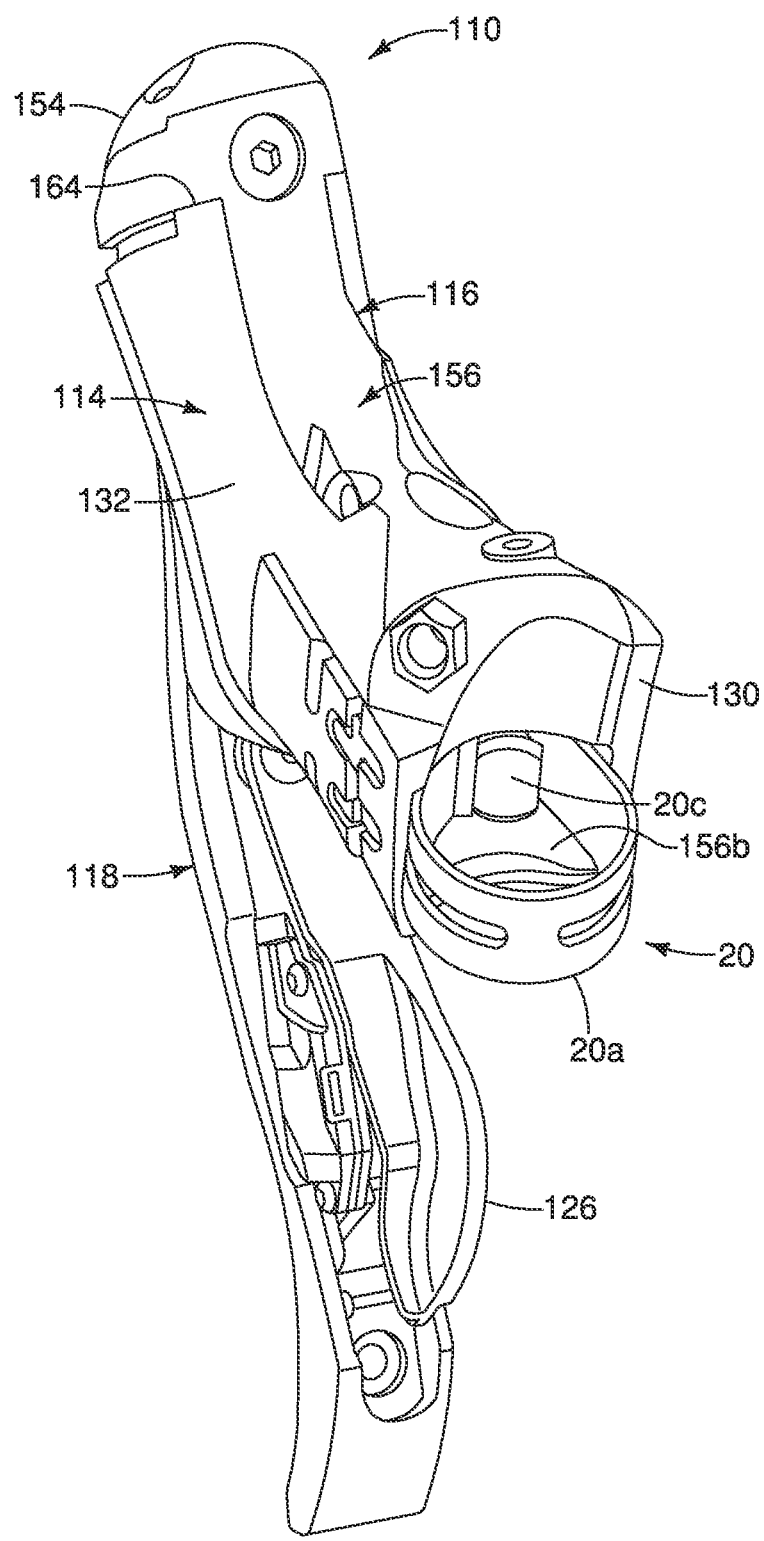
FIG. 11 is a rear perspective view of the bicycle hydraulic brake operating device illustrated in FIGS. 9 and 10 with the grip cover removed.
Figure 12:
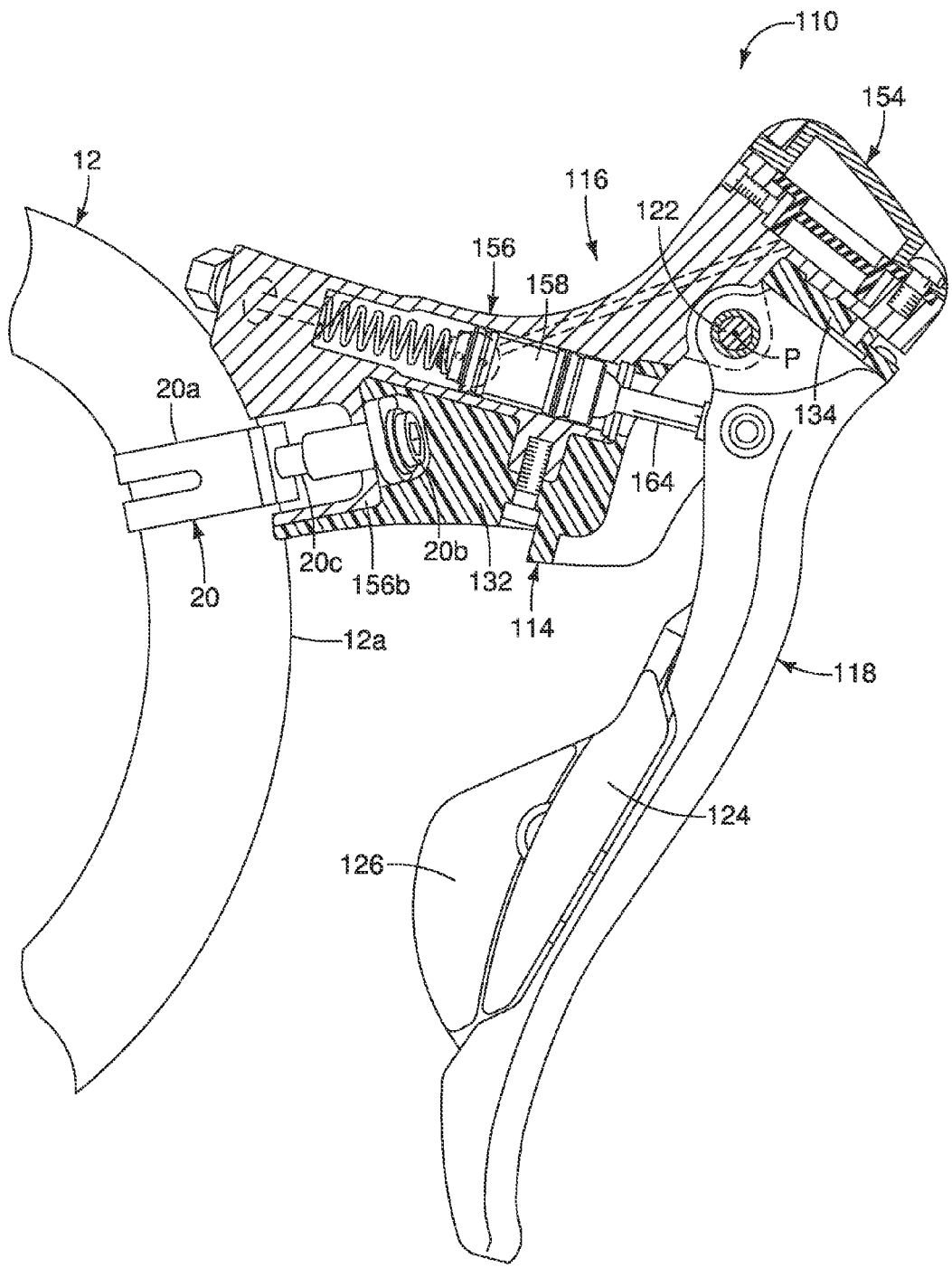
FIG. 12 is a center longitudinal cross sectional view of the bicycle hydraulic brake operating device illustrated in FIGS. 9 to 11 with the grip cover removed and the brake lever shown in elevation.
Figure 13:
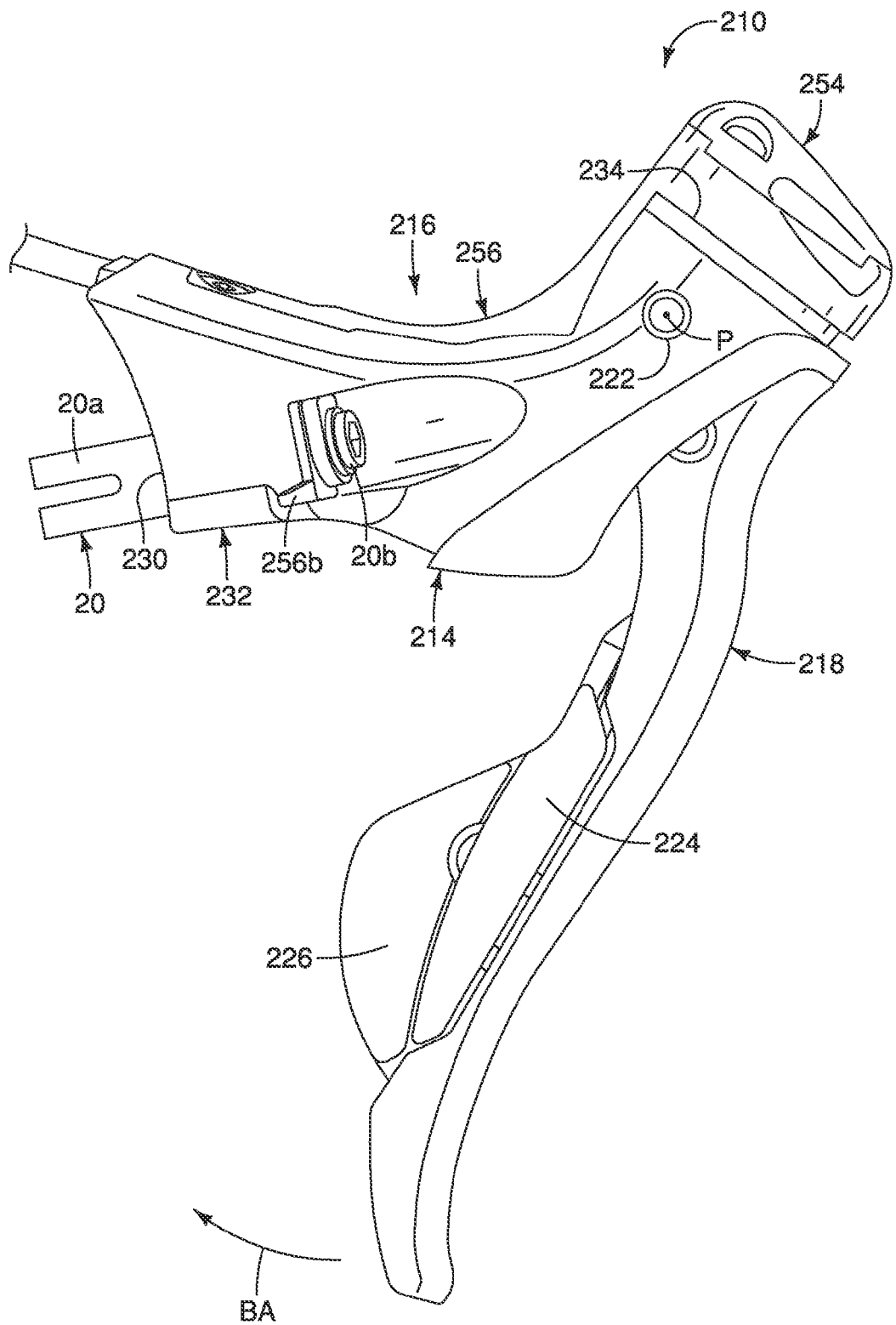
FIG. 13 is an outside elevational view of a bicycle hydraulic brake operating device in accordance with a third embodiment with the grip cover removed.

As illustrated in FIGS. 10 and 12, similar to the first embodiment, the hydraulic unit 116 is provided with a fluid reservoir tank 154 that is supported on the hydraulic cylinder housing 156. Also similar to the first embodiment, the hydraulic cylinder housing 156 of the hydraulic unit 116 is provided with an integral lever attachment portion 156a. The brake lever 118 is pivotally mounted to the lever attachment portion 156a of the hydraulic brake cylinder housing 156 by the pivot pin 122. Also the brake lever 118 is operatively coupled to a piston 158 by a connecting rod 164 of the hydraulic unit 116 to actuate the hydraulic unit 116 upon movement of the brake lever 118 in the same way as the first embodiment. However, unlike the first embodiment, the hydraulic unit 116 is provided with an integral handlebar attachment portion 156b having a curved handlebar contact surface 156c. The handlebar attachment portion 156b is configured such that the handlebar fastener 20 is directly attached thereto. In other words, the handlebar fastener 20 is indirectly attached to the main body 114 via the handlebar attachment portion 156b. In this way, in this third embodiment, the handlebar mounting structure (the handlebar fastener 20 and the handlebar attachment portion 156b) is disposed on the hydraulic unit 116.

The hydraulic unit 116 is identical to the hydraulic unit 16, except for the addition of the handlebar attachment portion 156b. Thus, the hydraulic unit 116 will not be discussed and/or illustrated in detail herein. In other words, the descriptions of the hydraulic unit 16 apply to the hydraulic unit 116, and operation of the hydraulic unit 116 is the same as the operation of the hydraulic unit 16.

Referring now to FIGS. 13 to 16, a bicycle hydraulic brake operating device 210 is illustrated in accordance with a third embodiment. The bicycle hydraulic operating device 210 basically includes a main body 214, a hydraulic unit 216, an operating lever 218 and the handlebar fastener 20 of the first embodiment. Here in this third embodiment, the operating lever 218 is directly pivotally attached to the main body 214, unlike the prior embodiments. Also in this third embodiment, the bicycle hydraulic brake operating device 210 has the handlebar fastener 20 directly mounted to the hydraulic unit 216 in the same manner as the second embodiment. In view of the similarity between the third embodiment and the first and second embodiments, the bicycle hydraulic operating device 210 will not be discussed in detail for the sake of brevity. Thus, the descriptions of the parts of the third embodiment that are identical or nearly identical to the parts of the prior embodiments may be omitted for the sake of brevity. Also in view of the similarity between the illustrated embodiments, the parts of the third embodiment that are identical in function to the corresponding parts of the prior embodiments will be given the same reference numerals as the parts of the first embodiment, but increased by two hundred.

In this second embodiment, the brake lever 218 is directly pivotally mounted to the main body 214 by a pivot pin 222 that defines the pivot axis P. Thus, the brake lever 218 is not directly coupled to the hydraulic unit 216 in contrast to the first embodiment. Similar to the first embodiment, the brake lever 216 is provided with a pair of gearshift operating parts 224 and 226 connected to a gearshift control unit (not shown). The main body 214 is the same as the main body 14, except that the main body 214 has been modified to accommodate the modifications to the hydraulic unit 216 as discussed below. Thus, the main body 214 includes a handlebar contact portion 230, a gripping portion 232 and a pommel portion 234. Although not shown, the grip cover 38 of the first embodiment is stretched over at least the gripping portion 232 and a pommel portion 234 in the same manner as the first embodiment.

Figure 14:
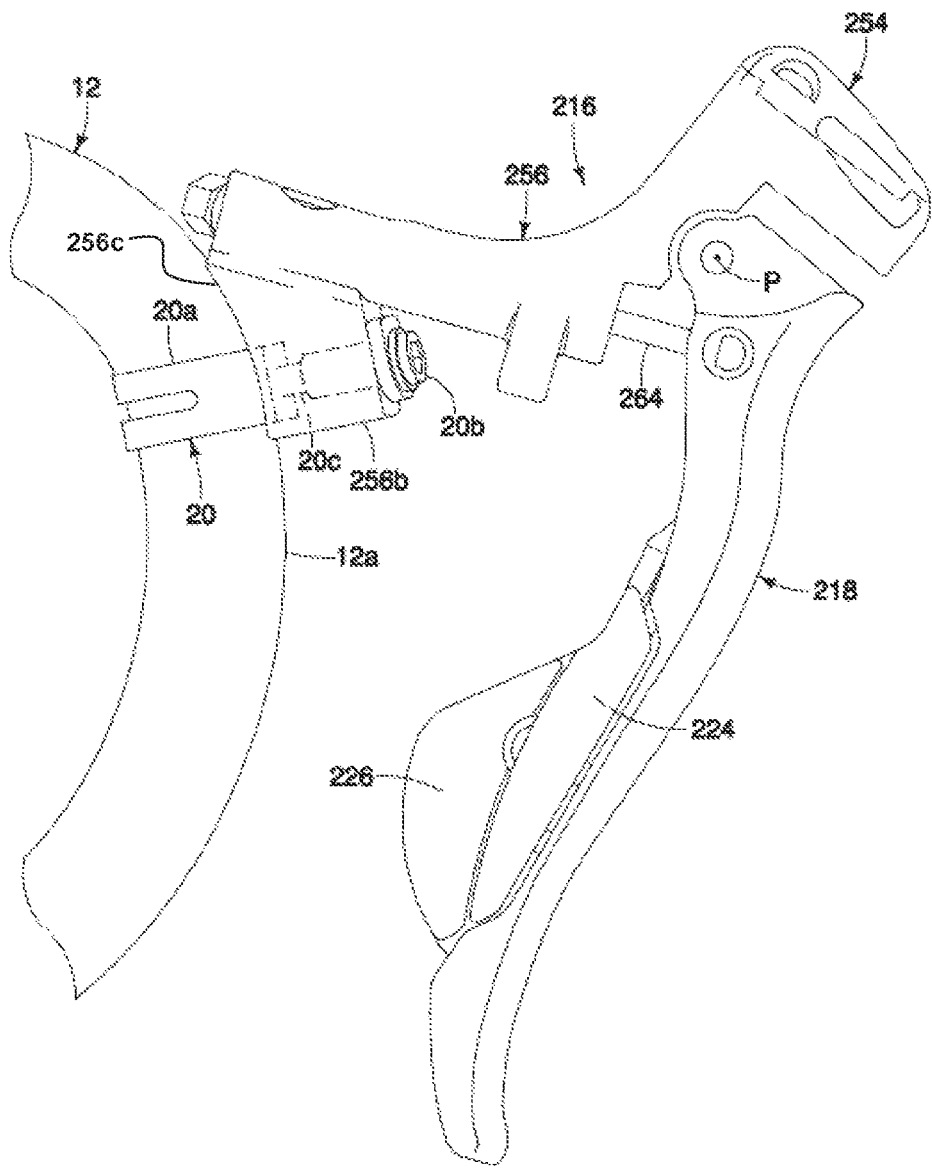
FIG. 14 is an outside elevational view of the hydraulic unit having the brake lever operatively attached to the master piston via the connecting rod with the main body removed.
Figure 15:
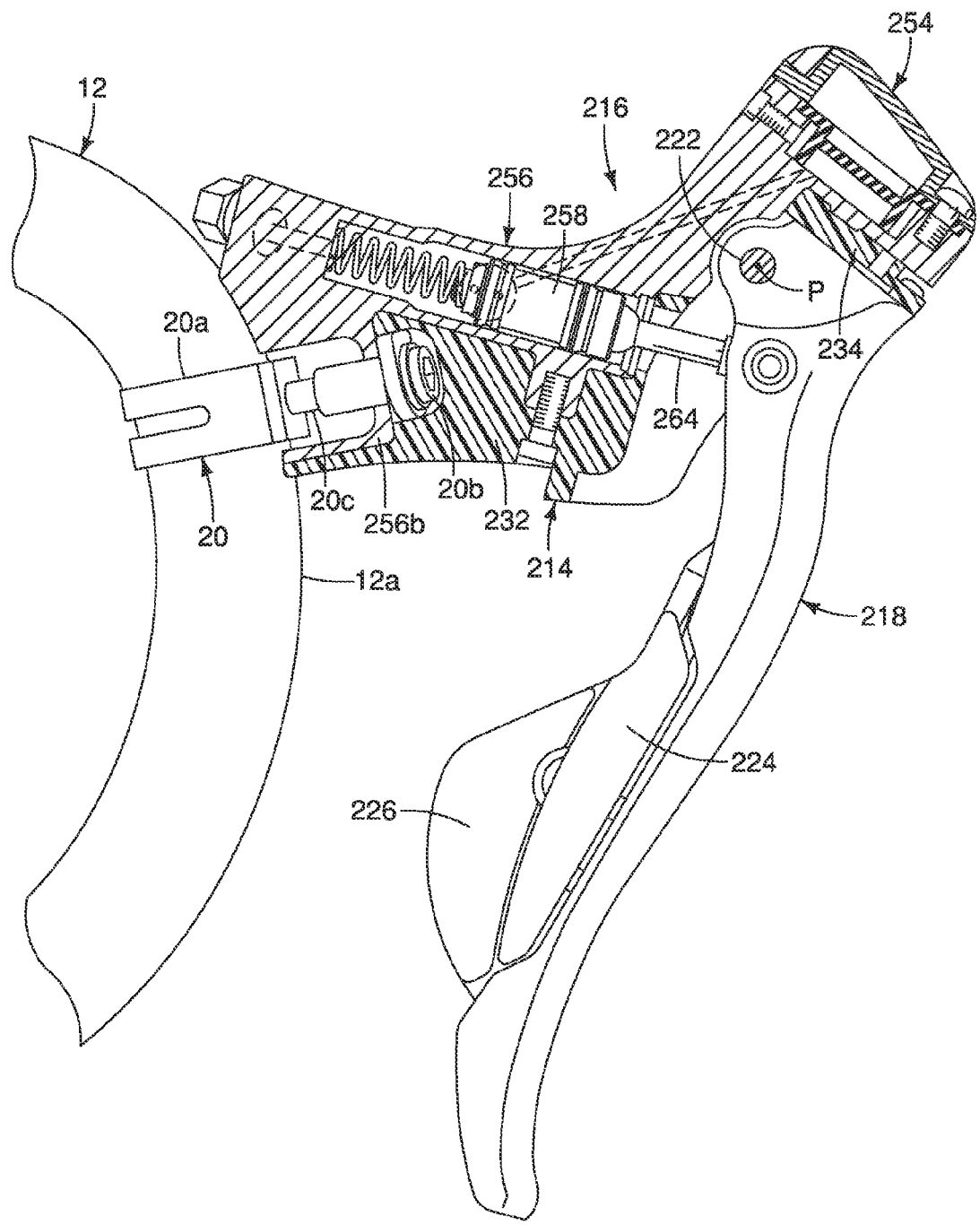
FIG. 15 is a center longitudinal cross sectional view of the bicycle hydraulic brake operating device illustrated in FIGS. 13 and 14 with the brake lever shown in elevation.
Figure 16:
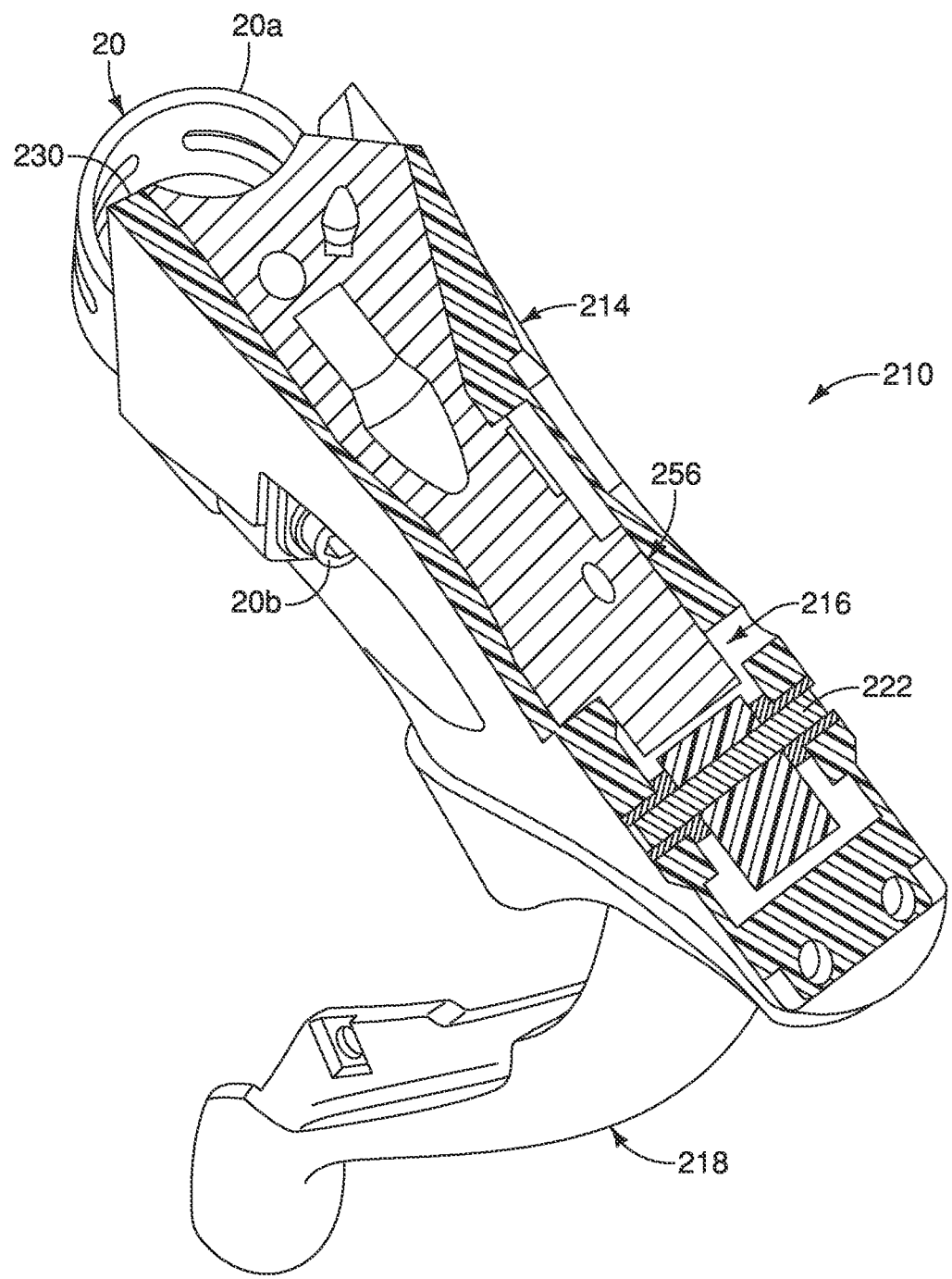
FIG. 16 is a perspective view of the bicycle hydraulic brake operating device illustrated in FIGS. 13 to 15 with a portion broken away to illustrate the pivotal connection of the brake lever to the main body.

As illustrated in FIGS. 14 and 15, similar to the first embodiment, the hydraulic unit 216 is provided with a fluid reservoir tank 254 that is supported on the hydraulic cylinder housing 256. Also similar to the first embodiment, the hydraulic cylinder housing 256 of the hydraulic unit 216 is provided with an integral handlebar attachment portion 256b having a curved handlebar contact surface 256c. The handlebar attachment portion 256b is configured such that the handlebar fastener 20 is directly attached thereto. In other words, the handlebar fastener 20 is indirectly attached to the main body 214 via the handlebar attachment portion 256b. In this way, in this third embodiment, the handlebar mounting structure (the handlebar fastener 20 and the handlebar attachment portion 256b) is disposed on the hydraulic unit 216.

Also the brake lever 218 is operatively coupled to a piston 258 by a connecting rod 264 of the hydraulic unit 216 to actuate the hydraulic unit 216 upon movement of the brake lever 118 in the same way as the first embodiment. However, unlike the first and second embodiments, the brake lever 218 is not pivotally mounted directly to the hydraulic unit 216 by the pivot pin 222. Rather, as mentioned above, the brake lever 218 is pivotally mounted directly to the main body 214 by the pivot pin 222

The hydraulic unit 216 is identical to the hydraulic unit 16, except for the addition of the handlebar attachment portion 256b and the brake lever 218 not being pivotally mounted to the hydraulic cylinder housing 256. Thus, the hydraulic unit 216 will not be discussed and/or illustrated in detail herein. In other words, the descriptions of the hydraulic unit 16 apply to the hydraulic unit 216, and operation of the hydraulic unit 216 is the same as the operation of the hydraulic unit 16.

Figure 17:
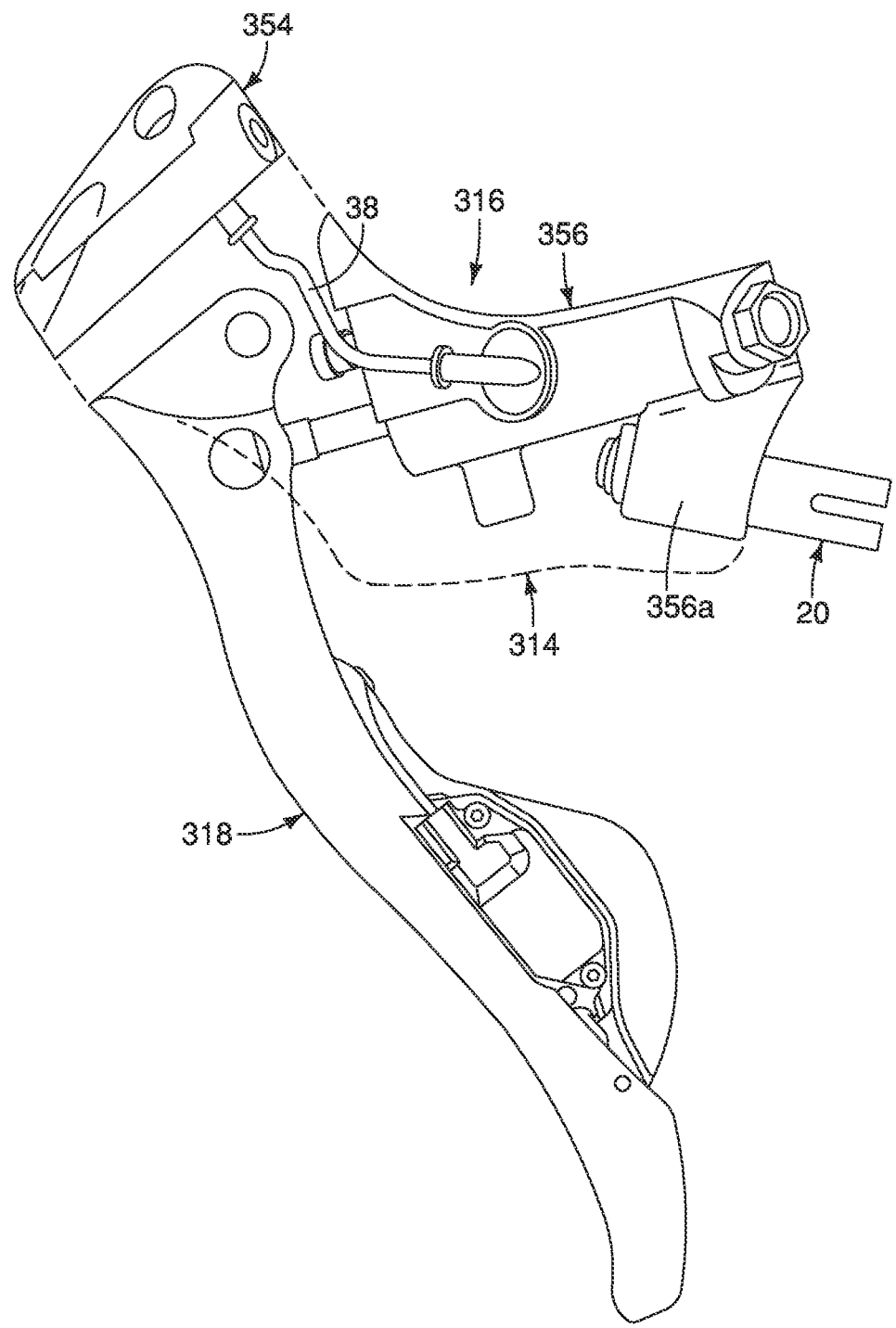
FIG. 17 is an inside elevational view of a hydraulic unit having a brake lever operatively attached to a master piston via a connecting rod in accordance with a fourth embodiment.

Referring now to FIG. 17, a bicycle hydraulic brake operating device 310 is illustrated in accordance with a fourth embodiment. The bicycle hydraulic operating device 310 basically includes a main body 314 (only illustrated in dashed lines), a hydraulic unit 316, an operating lever 318 and the handlebar fastener 20 of the first embodiment. Here in this fourth embodiment, the operating lever 318 is directly pivotally attached to the main body 314, similar to the third embodiment. Also in this fourth embodiment, the bicycle hydraulic brake operating device 310 has the handlebar fastener 20 directly mounted to the hydraulic unit 316 in the same manner as the second and third embodiments. In this way, in this third embodiment, the handlebar mounting structure (the handlebar fastener 20 and a handlebar attachment portion 356a of the hydraulic unit 316) is disposed on the hydraulic unit 316. However, in this fourth embodiment, a fluid reservoir tank 354 is provided as a separate part from a hydraulic cylinder housing 356 of the hydraulic unit 316. The reservoir of the fluid reservoir tank 354 is fluidly connected to the hydraulic chamber of the hydraulic cylinder housing 356 by a conduit 380.

The main body 314 is the same as the main body 14, except that the main body 314 has been modified to accommodate the modifications to the hydraulic unit 316 as discussed above. Also the hydraulic unit 316 is the same as the hydraulic unit 16, except that the hydraulic unit 316 has been modified to accommodate the modifications to the hydraulic unit 316 as discussed above. In view of the similarity between the fourth embodiment and the prior embodiments, the bicycle hydraulic operating device 310 will not be discussed in further detail for the sake of brevity. Thus, the construction and operation of the bicycle hydraulic brake operating device 310 can be readily understood by those skilled in the bicycle field from the descriptions of the parts of the prior embodiments.

In understanding the scope of the present invention, as used herein to describe the above embodiment(s), the following directional terms "forward", "rearward", "above", "downward", "vertical", "horizontal", "below" and "transverse" as well as any other similar directional terms refer to those directions of a bicycle equipped with the bicycle hydraulic component operating device. Accordingly, these terms, as utilized to describe the bicycle hydraulic component operating device should be interpreted relative to a bicycle equipped with the bicycle hydraulic component operating device as used in an upright riding position on a horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the bicycle field from this disclosure that various changes and modifications can be made herein without departing from the scope of the invention as defined in the appended claims. For example, while the present invention has been explained as a bicycle hydraulic brake operating device, the present invention can also apply to other bicycle component operating device. Also for example, the present invention can apply to a bicycle hydraulic component operating device for bicycle speed changing device, e.g. derailleur, internal hub and so on. Moreover, it will be apparent to those skilled in the bicycle field from this disclosure that the first to third embodiments can be modified such that the fluid reservoir tank is provided as a separate part from the hydraulic cylinder housing of the hydraulic unit in a manner similar to the fourth embodiment. In other words, the structures and functions of one embodiment can be adopted in another embodiment.

It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic operating device comprising:
   a main body including a first end, a second end, a pommel portion located at the second end, and a gripping portion disposed between the first end and the pommel portion;
   a hydraulic unit mounted to the main body, the hydraulic unit including a hydraulic cylinder housing, the hydraulic cylinder housing defining a cylinder bore within which a piston is movably disposed;
   a handlebar mounting structure including a handlebar attachment portion and a handlebar fastener, the handlebar attachment portion being disposed on the main body and located at the first end of the main body, the handlebar fastener being attached to the main body and configured to engage with a dropdown bicycle handlebar, the handlebar attachment portion and the handlebar fastener being separate from the hydraulic cylinder housing, the handlebar mounting structure being configured to be attached to a downwardly curved section of the dropdown bicycle handlebar; and
   a lever pivotally mounted to a lever attachment portion of the hydraulic unit, the lever attachment portion being formed as an integral part of the hydraulic cylinder housing of the hydraulic unit and located at the second end of the main body, the handlebar attachment portion including a curved handlebar contact surface configured to mate with a forward facing surface of the downwardly curved section of the dropdown bicycle handlebar in an installed state of the bicycle hydraulic operating device with respect to the dropdown bicycle handlebar.

2. The bicycle hydraulic operating device according to claim 1, wherein
the main body includes a receiving cavity, and the hydraulic unit is disposed within the receiving cavity.

3. The bicycle hydraulic operating device according to claim 1, wherein
the hydraulic unit is configured as a hydraulic brake unit.

4. The bicycle hydraulic brake operating device according to claim 3, wherein
the lever actuates the hydraulic unit upon movement of the lever relative to the hydraulic unit to perform a braking operation.

5. The bicycle hydraulic operating device according to claim 2, wherein
the gripping portion of the main body has a pair of lateral sidewalls with the receiving cavity formed between the sidewalls and an insertion opening located between the lateral sidewalls.

6. The bicycle hydraulic operating device according to claim 5, wherein
the insertion opening is formed in a top wall of the main body.

7. A bicycle hydraulic operating device comprising:
a main body including a first end, a second end, a pommel portion located at the second end, and a gripping portion disposed between the first end and the pommel portion;
a hydraulic unit that is separate from the main body and mounted to the main body, the hydraulic unit including a hydraulic cylinder housing having a cylinder bore and a piston movably disposed within the cylinder bore;
a handlebar mounting structure including a handlebar attachment portion that is formed as an integral part of the hydraulic cylinder housing and located at the first end of the main body, the handlebar mounting structure being configured to be attached to a downwardly curved section of a dropdown bicycle handlebar; and
a lever pivotally mounted about a pivot axis to the hydraulic unit, the pivot axis being located at the second end of the main body, the lever extending downward from the pivot axis along a direction perpendicular to a longitudinal center axis of the hydraulic cylinder housing,
the handlebar attachment portion including a curved handlebar contact surface configured to mate with a forward facing surface of the downwardly curved section of the dropdown bicycle handlebar in an installed state of the bicycle hydraulic operating device with respect to the dropdown bicycle handlebar, the handlebar mounting structure including a handlebar fastener that is at least partially disposed directly below the cylinder bore of the hydraulic unit along a direction parallel to the downward direction in which the lever extends
the gripping portion being made of a rigid material and configured to fill a space between the handlebar attachment portion and the pivot axis below the hydraulic cylinder housing.

8. The bicycle hydraulic operating device according to claim 7, wherein
the hydraulic unit is configured as a hydraulic brake unit.

9. The bicycle hydraulic operating device according to claim 8, wherein
the lever actuates the hydraulic unit upon movement of the lever relative to the hydraulic unit to perform a braking operation.

10. The bicycle hydraulic operating device according to claim 7, wherein
the main body includes a receiving cavity, and the hydraulic unit is disposed within the receiving cavity.

11. The bicycle hydraulic operating device according to claim 10, wherein
the gripping portion of the main body has a pair of lateral sidewalls with the receiving cavity formed between the sidewalls and an insertion opening located between the lateral sidewalls.

12. The bicycle hydraulic operating device according to claim 11, wherein
the insertion opening is formed in a top wall of the main body.

13. The bicycle hydraulic operating device according to claim 1, wherein
the hydraulic unit includes an outlet port located at the first end of the main body and a fluid reservoir tank arranged at the second end of the main body.

14. The bicycle hydraulic operating device according to claim 7, wherein
the hydraulic unit includes an outlet port located at the first end of the main body and a fluid reservoir tank arranged at the second end of the main body.

15. The bicycle hydraulic operating device according to claim 1, wherein
the handlebar contact surface is configured to extend beyond the handlebar fastener in an upward direction along the forward facing surface of the dropdown bicycle handlebar in the installed state of the bicycle hydraulic operating device with respect to the dropdown bicycle handlebar.

16. The bicycle hydraulic operating device according to claim 7, wherein
the handlebar contact surface is configured to extend beyond the handlebar fastener in an upward direction along the forward facing surface of the dropdown bicycle handlebar in an installed state of the bicycle hydraulic operating device with respect to the dropdown bicycle handlebar.

17. The bicycle hydraulic operating device according to claim 1, further comprising:
a grip cover made of an elastic material and overlying at least portions of the gripping portion and the pommel portion.

18. The bicycle hydraulic operating device according to claim 5, wherein
at least a portion of an external surface of the hydraulic cylinder housing is exposed through the insertion opening.

19. The bicycle hydraulic operating device according to claim 11, wherein
at least a portion of an external surface of the hydraulic cylinder housing is exposed through the insertion opening.

20. The bicycle hydraulic operating device according to claim 1, wherein
the handlebar attachment portion is formed integrally with the main body.

21. The bicycle hydraulic operating device according to claim 1, wherein
the main body is attached to the hydraulic cylinder housing with a fastener.

22. The bicycle hydraulic operating device according to claim 7, wherein
the main body is attached to the hydraulic cylinder housing with a fastener.

23. The bicycle hydraulic operating device according to claim 7, wherein
a grip cover made of an elastic material is stretched over at least the gripping portion and the pommel portion of the main body.

24. A bicycle hydraulic operating device comprising:
a main body including a first end, a second end, a pommel portion located at the second end, and a gripping portion disposed between the first end and the pommel portion;
a hydraulic unit that is separate from the main body and mounted to the main body, the hydraulic unit including a hydraulic cylinder housing having a cylinder bore and a piston movably disposed within the cylinder bore;
a handlebar mounting structure including a handlebar attachment portion that is formed as an integral part of the hydraulic cylinder housing and located at the first end of the main body, the handlebar mounting structure being configured to be attached to a downwardly curved section of a dropdown bicycle handlebar; and
a lever pivotally mounted about a pivot axis to the main body, the pivot axis being located at the second end of the main body, the lever extending downward from the pivot axis along a direction perpendicular to a longitudinal center axis of the hydraulic cylinder housing,
the handlebar attachment portion including a curved handlebar contact surface configured to mate with a forward facing surface of the downwardly curved section of the dropdown bicycle handlebar in an installed state of the bicycle hydraulic operating device with respect to the dropdown bicycle handlebar, the handlebar mounting structure including a handlebar fastener that is at least partially disposed directly below the cylinder bore of the hydraulic unit along a direction parallel to the downward direction in which the lever extends.

25. The bicycle hydraulic operating device according to claim 24, wherein
the gripping portion is made of a rigid material and configured to fill a space between the handlebar attachment portion and the pivot axis below the hydraulic cylinder housing.

26. The bicycle hydraulic operating device according to claim 24, wherein
a grip cover made of an elastic material is stretched over at least the gripping portion and the pommel portion of the main body.

27. The bicycle hydraulic operating device according to claim 24, wherein
the main body is attached to the hydraulic cylinder housing with a screw.

* * * * *